(12) United States Patent
Greenlee et al.

(10) Patent No.: US 11,686,180 B2
(45) Date of Patent: Jun. 27, 2023

(54) VIRTUAL BRAKE SYSTEM

(71) Applicant: The Charles Machine Works, Inc., Perry, OK (US)

(72) Inventors: Joseph G. Greenlee, Perry, OK (US); Aleksander S. Wolfe, Stillwater, OK (US); Jarred R. Callaway, Stillwater, OK (US); Max A. Metcalf, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 17/473,419

(22) Filed: Sep. 13, 2021

(65) Prior Publication Data

US 2021/0404293 A1   Dec. 30, 2021

Related U.S. Application Data

(63) Continuation of application No. 16/934,757, filed on Jul. 21, 2020, now Pat. No. 11,118,430, which is a continuation of application No. 15/830,949, filed on Dec. 4, 2017, now Pat. No. 10,724,347.

(60) Provisional application No. 62/429,550, filed on Dec. 2, 2016.

(51) Int. Cl.
| | |
|---|---|
| *E21B 7/04* | (2006.01) |
| *E21B 41/00* | (2006.01) |
| *E21B 44/10* | (2006.01) |
| *F16D 65/16* | (2006.01) |
| *F16D 63/00* | (2006.01) |
| *E21B 44/00* | (2006.01) |

(52) U.S. Cl.
CPC ............ *E21B 41/0092* (2013.01); *E21B 7/04* (2013.01); *E21B 7/046* (2013.01); *E21B 41/00* (2013.01); *E21B 44/00* (2013.01); *E21B 44/10* (2013.01); *F16D 63/006* (2013.01); *F16D 65/16* (2013.01)

(58) Field of Classification Search
CPC .................................. E21B 7/04; E21B 7/046
See application file for complete search history.

(56) References Cited

U.S. PATENT DOCUMENTS

| | | |
|---|---|---|
| 2,667,820 A | 2/1954 | De Vlieg |
| 3,470,968 A | 10/1969 | Melshemer et al. |
| 4,078,452 A | 3/1978 | Rosler |
| 5,127,291 A | 7/1992 | Lothammer |
| 5,720,354 A | 2/1998 | Stump et al. |
| 6,557,651 B1 | 5/2003 | Norby et al. |
| 7,134,513 B1 | 11/2006 | Randall et al. |
| 7,628,226 B2 | 12/2009 | Mitchell et al. |
| 9,598,905 B2 | 3/2017 | Van Zee et al. |
| 10,724,347 B2 * | 7/2020 | Greenlee ................... E21B 7/04 |

(Continued)

FOREIGN PATENT DOCUMENTS

GB            727603 A       4/1955

*Primary Examiner* — Giovanna Wright
(74) *Attorney, Agent, or Firm* — Tomlinson McKinstry, P.C.

(57) ABSTRACT

A brake system for maintaining an angular position of a spindle assembly. A pump-powered motor drives rotation of a spindle on the machine. When no rotation is desired, the spindle will slow, then stop at a desired angular orientation. A rotational sensor will determine the clock position, and a controller compares that to a desired angular orientation. If an error tolerance is exceeded, the motor will rotate the spindle back to the desired orientation.

20 Claims, 10 Drawing Sheets

(56) References Cited

U.S. PATENT DOCUMENTS

| | | |
|---|---|---|
| 2003/0205410 A1 | 11/2003 | Koch et al. |
| 2004/0028476 A1* | 2/2004 | Payne ............... E21B 44/00 405/184 |
| 2004/0188142 A1 | 9/2004 | Self et al. |
| 2008/0185185 A1 | 8/2008 | Mitchell et al. |
| 2009/0057021 A1 | 3/2009 | Williams |
| 2014/0050522 A1 | 2/2014 | Slaughter, Jr. et al. |
| 2016/0069136 A1 | 3/2016 | Metcalf et al. |
| 2016/0090831 A1 | 3/2016 | Malcolm et al. |

* cited by examiner

VIRTUAL BRAKE SYSTEM

FIELD

The present invention relates generally to a control system for horizontal directional drills.

SUMMARY

The invention is directed to a system. The system comprises a spindle assembly, a motor, a sensor, and a controller. The motor rotates the spindle assembly. The sensor determines a clock position of the spindle assembly. The controller has a virtual brake condition. When in the virtual brake condition, the controller receives signals indicative of the clock position from the sensor. The clock position is compared to a desired orientation. The motor then is actuated to rotate the spindle assembly to the desired orientation.

DETAILED DESCRIPTION

Figure 1:
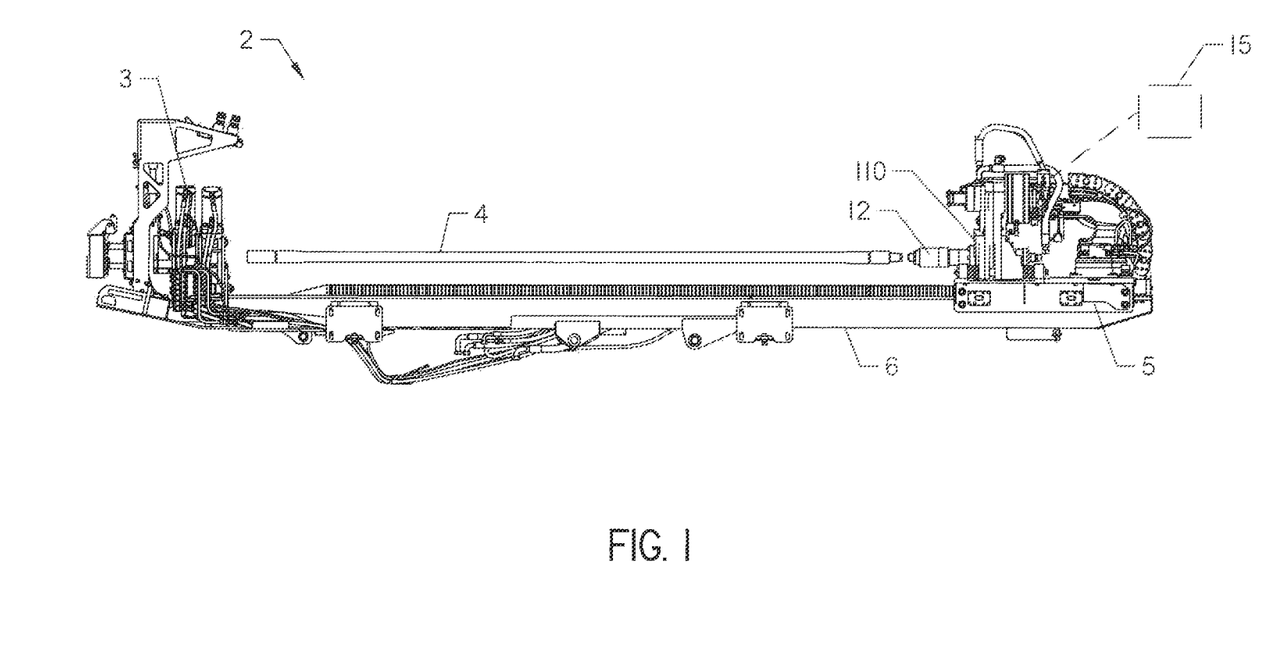
FIG. 1 is a side view of a horizontal directional drilling machine.

The present invention is directed to a rotation brake for the spindle on a horizontal directional drill (HDD) system. With reference to FIG. 1, a horizontal directional drill 2 "makes up" pipe segments 4 to form a "drill string", then advances the drill string forward through rotation and thrust provided to a drill bit (not shown). The process is repeated until a borehole of a desired length is created. Also, the drill 2 may be used with a "backreamer", wherein a drill string is pulled back through a pilot bore, and thrust and rotation are provided at a backreaming bit to enlarge the pilot bore. In this method, sections of pipe are removed from the drill string by the drill as the backreamer is pulled through the bore.

It should be understood that during repetitive drilling operations, a spindle assembly 12 is rotated and advanced by a carriage 5. Advancement stops when the spindle assembly reaches its limit of travel relative to a drill frame 6. At this point, the spindle assembly 12 is disconnected from the drill string. An additional pipe section is then added to the string, extending its overall length. The rotation provided to the spindle 12 by a motor 16 during drilling is in a first rotational direction, while a second rotational direction is used when the spindle is unthreaded from the drill string.

During drilling operations, it may be advantageous to advance the drill string without rotation of the drill bit. For example, in a two-pipe system or downhole mud motor system, advancing a drill string without rotation allows for "steering" of the drill bit. A description of such a two-pipe system with steering is given in U.S. Pat. No. 5,490,569, issued to Brotherton, et al. A rotation brake, such as rotation brake 10 (FIGS. 2 and 3), allows the clock position of a drill string to be maintained while the drill string is advanced. The "clock position" should be understood to be the angular displacement from a vertical axis that extends through the spindle. This spindle "steering" position is obtained by stopping the rotation of the spindle 12 with input from the drill head sonde (not shown) to achieve a drill direction change.

Figure 8A:
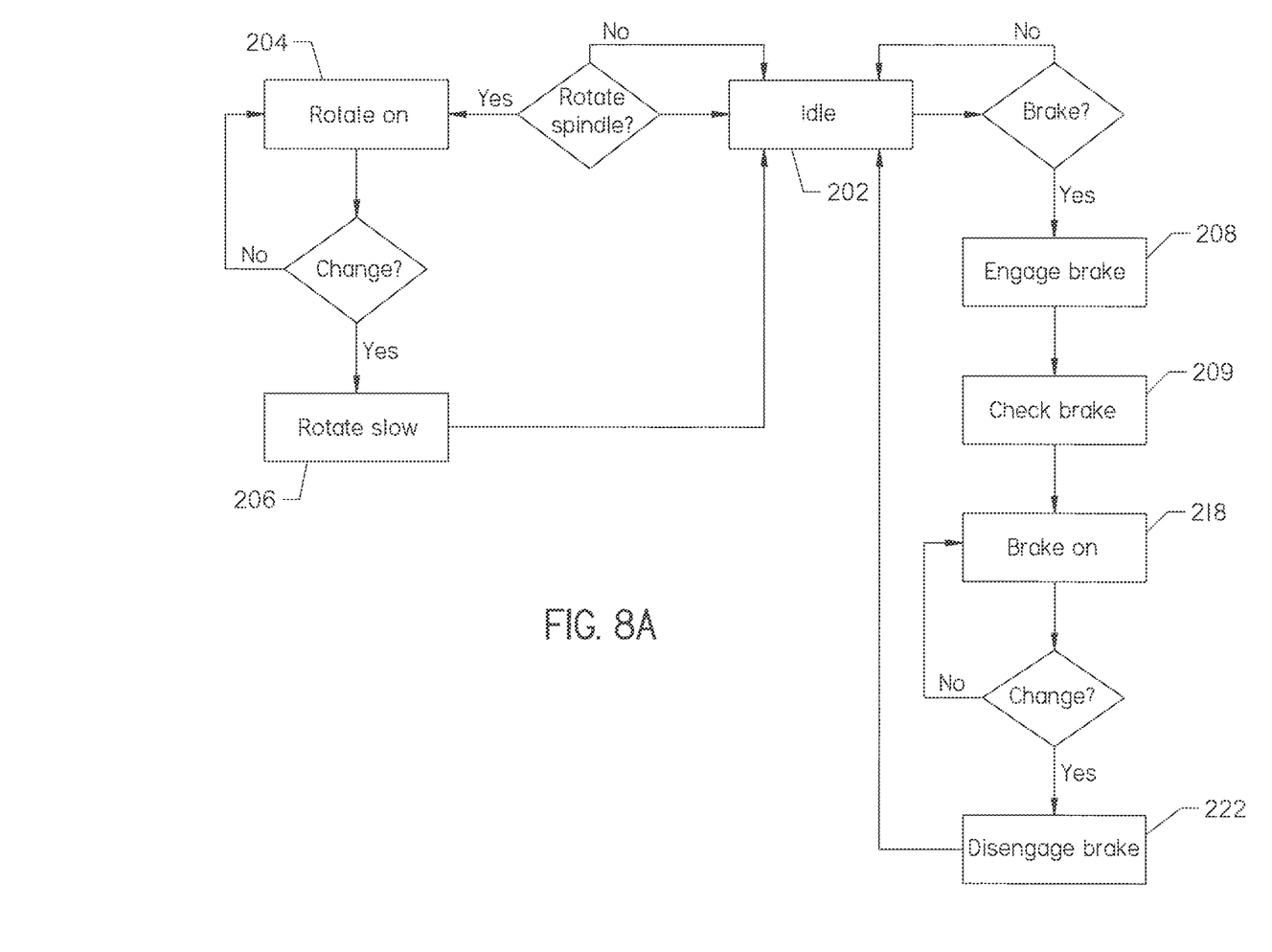
FIG. 8A is a diagrammatic representation of control logic for rotation and braking of a spindle.
Figure 8B:
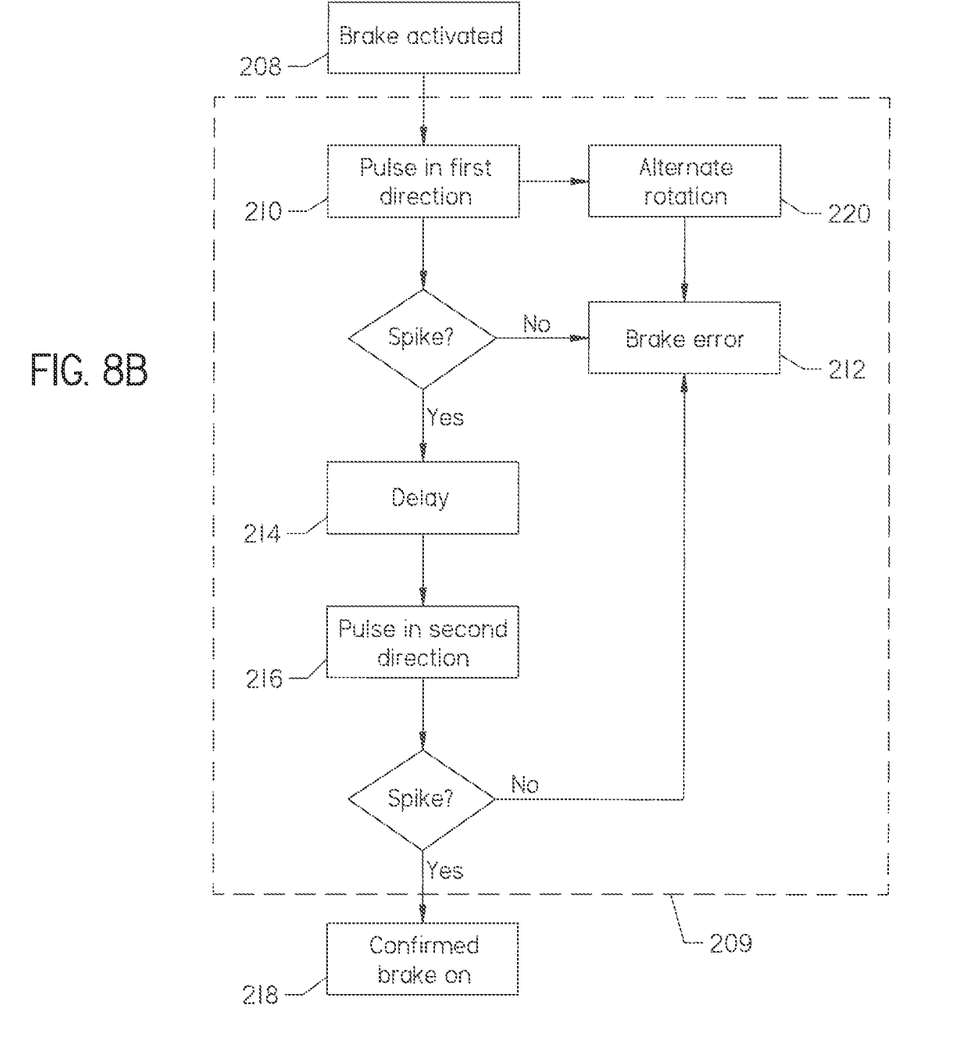
FIG. 8B is a diagrammatic representation of control logic for confirming whether the rotation brake is in the engaged position.

The present invention is directed to a system for assuring maintenance of such a clock position of the spindle 12. Operation of a first embodiment of the system, which uses an actual brake, is shown in FIGS. 8A-8B. The first embodiment provides a set of sensors and controllers that determine whether or not the rotation brake 10 is properly engaged to prevent rotation of the spindle assembly 12.

Figure 9:
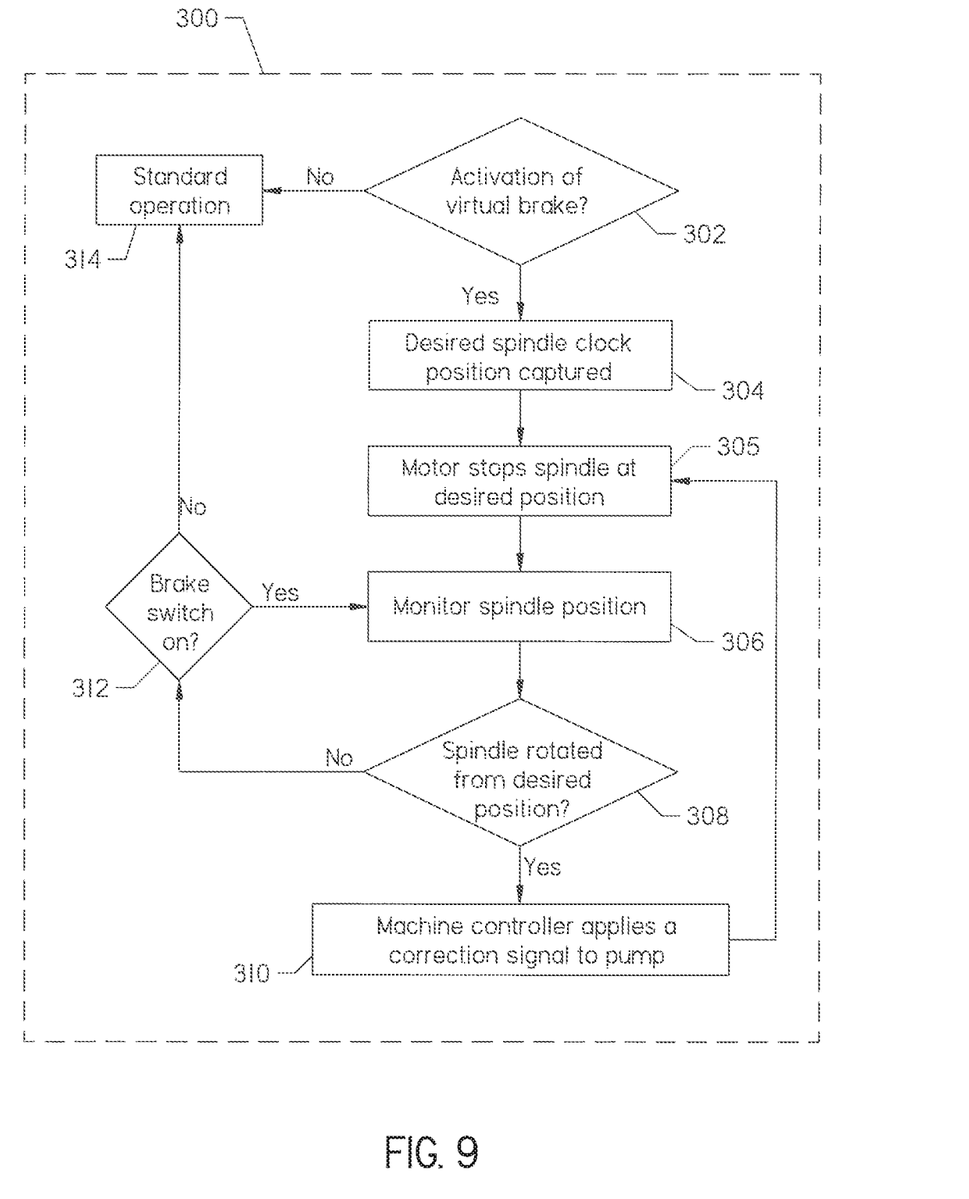
FIG. 9 is a diagrammatic representation of control logic for a virtual brake system for use with the horizontal directional drilling system of FIG. 1.

Operation of a second embodiment of the system, which uses a "virtual brake" is shown in FIG. 9. The virtual brake uses the motor 16 to maintain a selected angular position of the spindle assembly 12 rather than a physical brake such as rotation brake 10. The virtual brake may be used instead of a rotation brake 10 or may be used as a feature on a machine that also utilizes a mechanical rotation brake.

Figure 2:
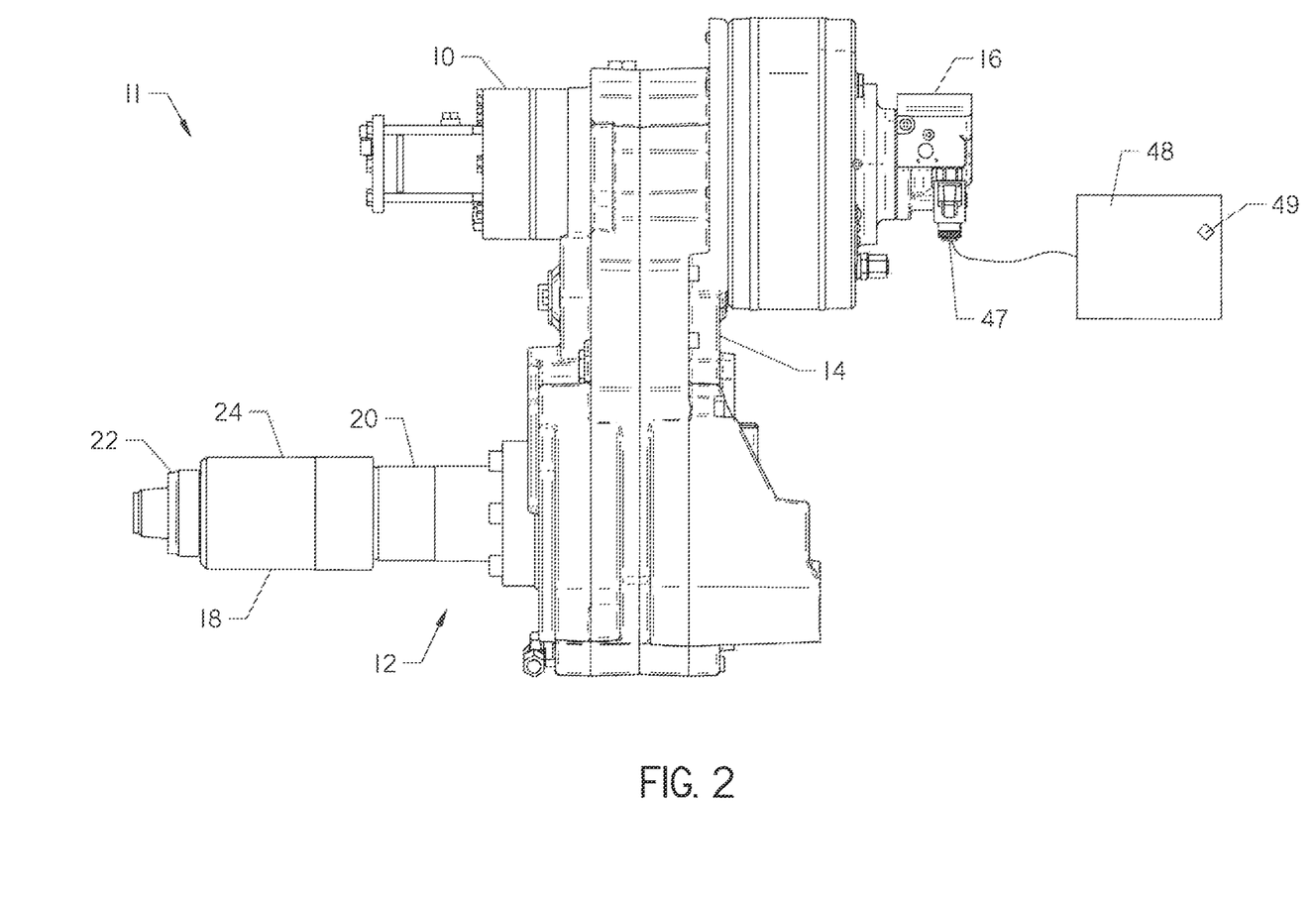
FIG. 2 is a side view of an assembly comprising a spindle, rotation brake, and motor for use with the machine of FIG. 1.
Figure 3:
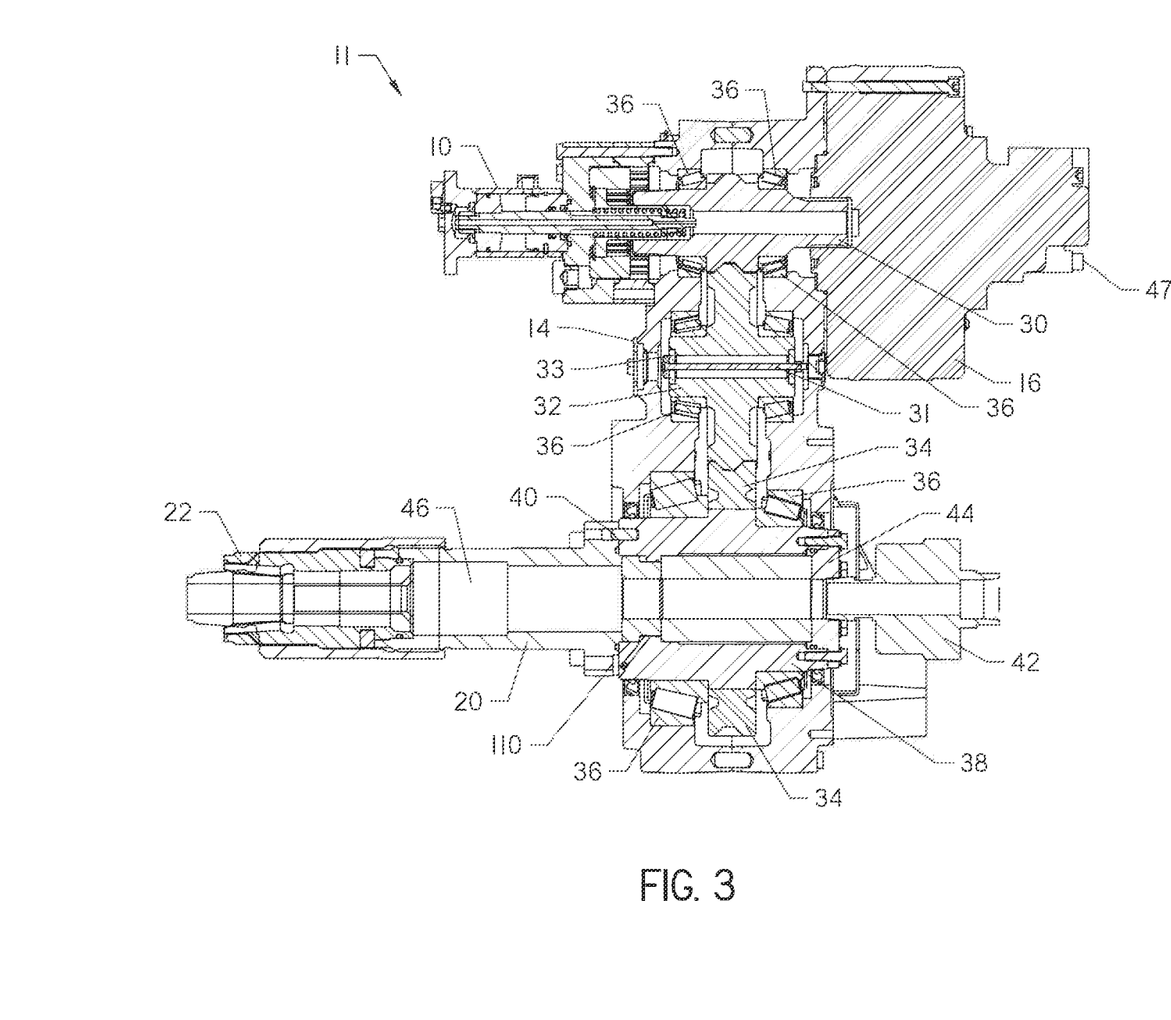
FIG. 3 is a sectional side view of the assembly of FIG. 2.

Turning now to FIGS. 2 and 3, shown therein is the rotation brake 10 for use with a rotation assembly 11. The rotation assembly 11 comprises the spindle assembly 12, a gearbox 14 and the motor 16. The motor 16 turns gear and pinion elements 30, 32, 34 within the gearbox 14 which, in turn, rotate the spindle assembly 12. The rotation brake 1o is utilized to stop rotation of the spindle assembly 12.

The spindle assembly 12 comprises a drill string connection 18. The connection 18, as shown, comprises a shaft 20 and a saver subassembly 22. The shaft 20 is preferably connected by a collar 24 to the saver subassembly 22. The saver subassembly 22 is adapted to thread onto pipe segments 4 (FIG. 1) that are being made up and broken out from a drill string. By utilizing the saver subassembly 22, a replaceable part, the spindle 10 is insulated from wear associated with repeated threading and unthreading from the segments 4 of drill string. An example of a saver subassembly is shown in U.S. Patent Publication No. 2014/0050522, the contents of which are incorporated herein by reference.

A rotational sensor 110 may be provided in the spindle assembly to determine its "clock" position, rotational speed, and direction of spin. The rotational sensor 110 may be an accelerometer, a set of magnets, or other mechanism.

A controller 15 (FIG. 1) is provided with the drilling machine 2 to receive signals from the rotational sensor 110. The controller 15 may be integrally formed with the drilling machine 2 in a cab or operator station (not shown). Alternatively, the controller may be located remotely from the drilling machine. The controller 15 receives signals from the drilling machine 2 and provides operational instructions for operation of the motor 16, carriage 5, and rotation brake 10. The operational instructions may be generated by the controller 15 in response to operator input, or by control logic as described herein.

The controller 15 may operate other elements of the drilling machine 2, such as the wrench assembly 3 for making up segments 4 of drill string. The controller may also receive information from a downhole tool and tracker system (not shown).

Figure 4:
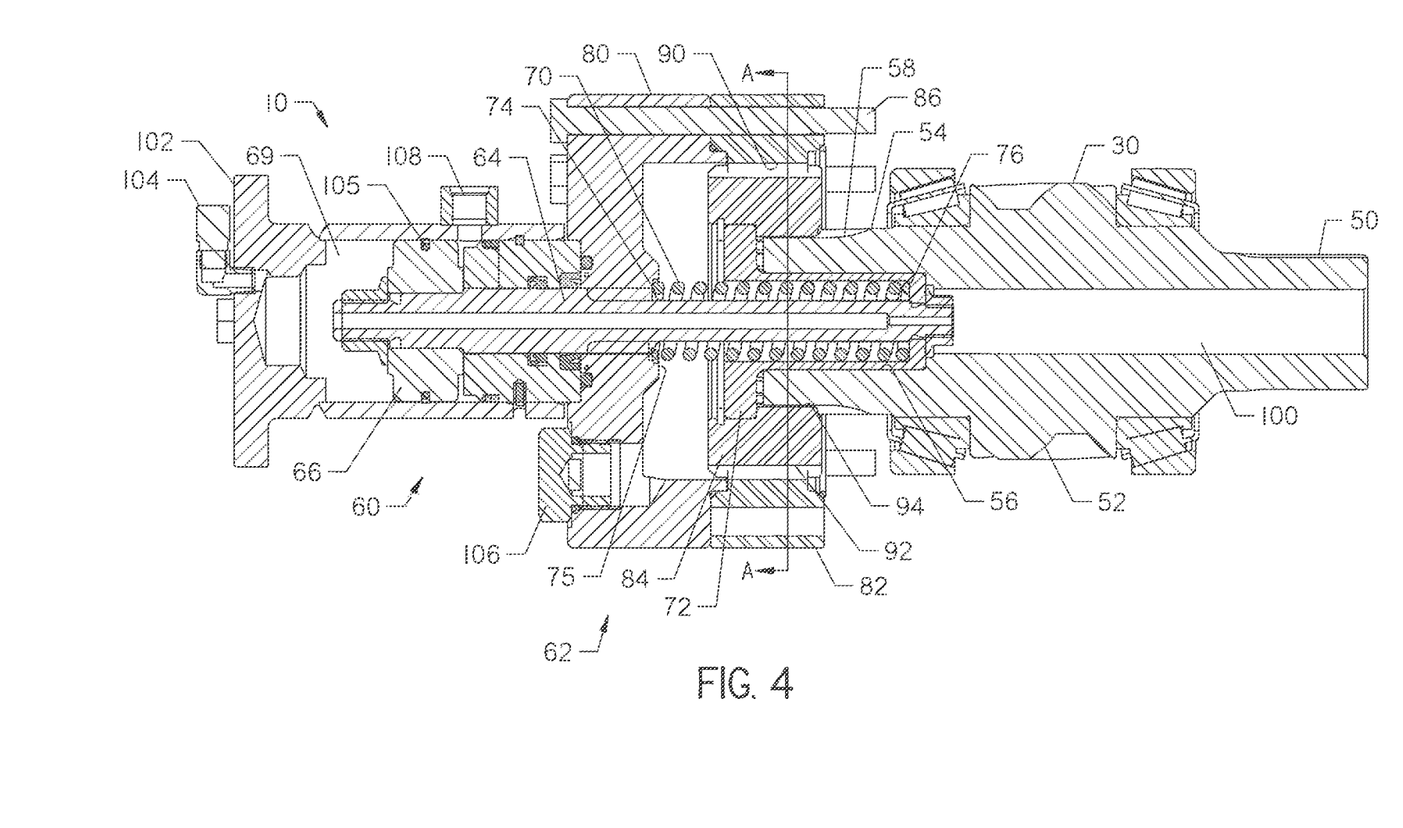
FIG. 4 is a sectional side view of a pinion and rotation brake for use with the assembly of FIG. 2. The rotation brake is in an engaged position.
Figure 5:
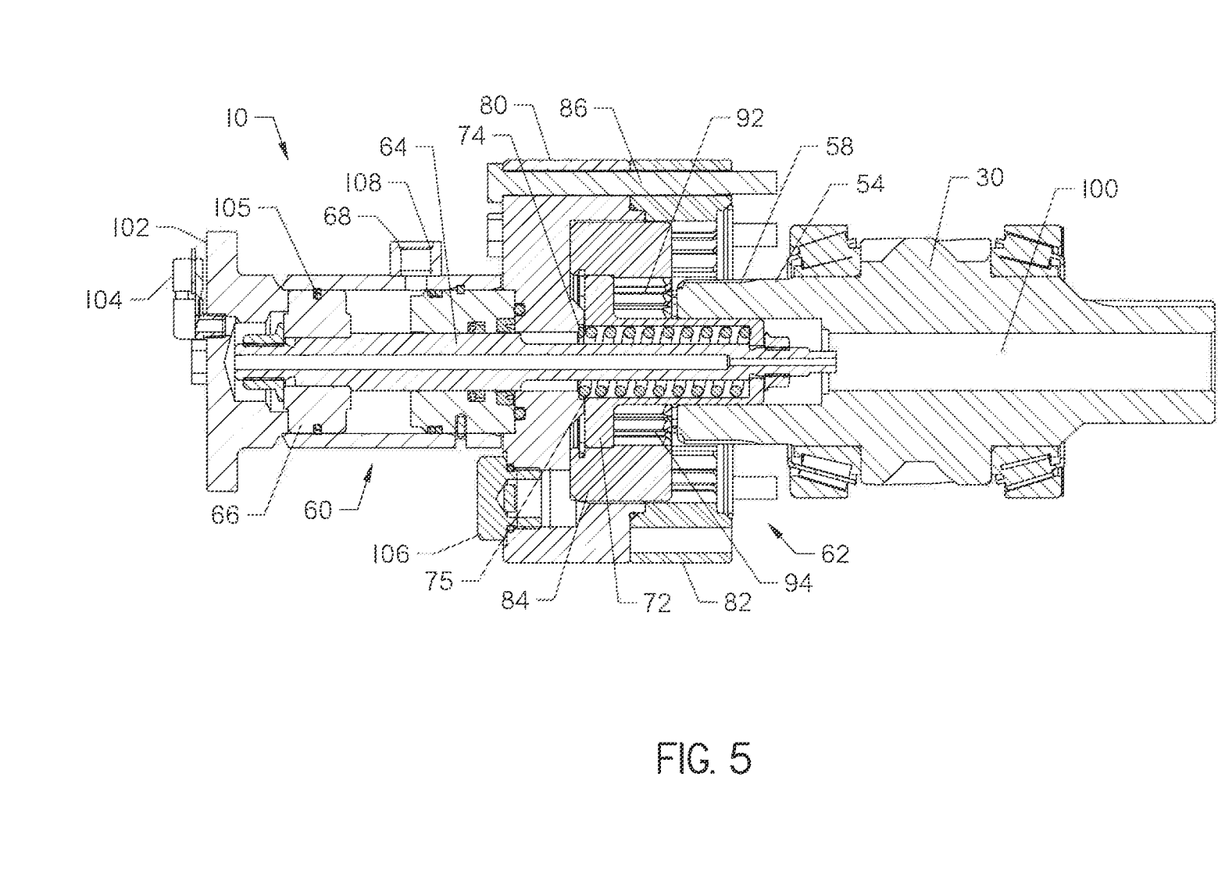
FIG. 5 is the sectional side view of the rotation brake of FIG. 4 with the rotation brake in a disengaged position.

With reference to FIGS. 4-5, the rotation brake 10 is movable between an engaged position and a disengaged position. In the engaged position, as shown in FIG. 4, the rotation brake 10 engages lock interface 54 of a pinion element 30. The lock interface 54 prevents rotation of the spindle assembly 12 (FIG. 3) by the motor 16. In the disengaged position, as shown in FIG. 5, the rotation brake 10 does not engage the lock interface 54 and the motor output pinion 30 rotates freely relative to the rotation brake.

When the rotation brake 10 is moved to the engaged position, steps should be taken to protect the motor 16 from damage. For example, the motor 16 may be placed into neutral, slowed or stopped in response to engagement of the rotation brake 10.

Turning back to FIG. 2, the motor 16 is powered by hydraulic fluid which flows in a circuit that enters the motor at input 47. Flow of fluid within the circuit is powered by a pump 48, which includes a pressure sensor 49 that monitors pressure within the circuit. If the rotation brake 10 is engaged while the pump 48 operates, the motor 16 and the spindle 12 will not operate normally. Such engagement is indicated by a spike in pressure within the circuit. Such a spike can be observed by the pressure sensor 49 and signaled to the controller 15.

Alternatively, the motor 16 may be powered by either a direct current or alternating current electrical power source. An electric motor 16 may comprise a sensor for determining an electrical load on the motor 16. Such a sensor would perform a similar function as pressure sensor 49.

Signals from the pressure sensor 49 may be received by the controller 15 (FIG. 1). The controller 15 may automatically perform functions, such as determining the speed and direction of spindle 12 rotation caused by the motor 16 and engagement or disengagement of the rotation brake 1o. The controller 15 may also combine information received with inputs from an operator.

With reference to FIGS. 3-5, the gearbox 14 comprises the motor output pinion 30, a central gear 32, and a spindle output gear 34. Each of the motor output pinion 30, central gear 32, and spindle output gear 34 are rotationally supported within the gearbox 14 by bearings 36. The motor output pinion 30 is rotationally driven by motor 16. In turn, the pinion 30 interfaces with central gear 32, which likewise drives spindle output gear 34. The central gear 32 rotates about screw 31 which is connected to the gearbox 14 by a vented washer 33. The vented washer 33 allows gasses within and proximate the central gear 32 to vent to avoid pockets of high pressure within the system due to rotation of the central gear. The spindle output gear 34 is rotationally locked to output shaft 38, which is connected to the drive chuck shaft 20 of the spindle assembly 12. As shown, the drive chuck shaft 20 is attached to the output shaft 38 by bolts 40. Rotation of the motor output pinion 30, central gear 32, spindle output gear 34 and drive chuck shaft 20, and therefore connected pipe segments 4 (FIG. 1) are driven by the motor 16. Actuation of the rotation brake 10, which will be discussed in further detail with respect to FIGS. 4-7, stops or prevents rotation of these elements.

Continuing with FIGS. 4-5, the rotation assembly 11 further comprises a water swivel 42 attached to the back of the output shaft 40 through an output cap 44. The water swivel 42 is a rotating connection element that allows for drilling fluids, such as water, air, bentonite, and other known fluids, to be provided between a high-pressure pump (not shown) for providing the drilling fluid, and the rotating elements of the drill string and output shaft 40. Fluid provided through the water swivel 42 enters the drill string (not shown) during drilling operations through an internal passage 46 located within the output shaft 40, drive chuck shaft 20, and saver subassembly 22.

Figure 7:
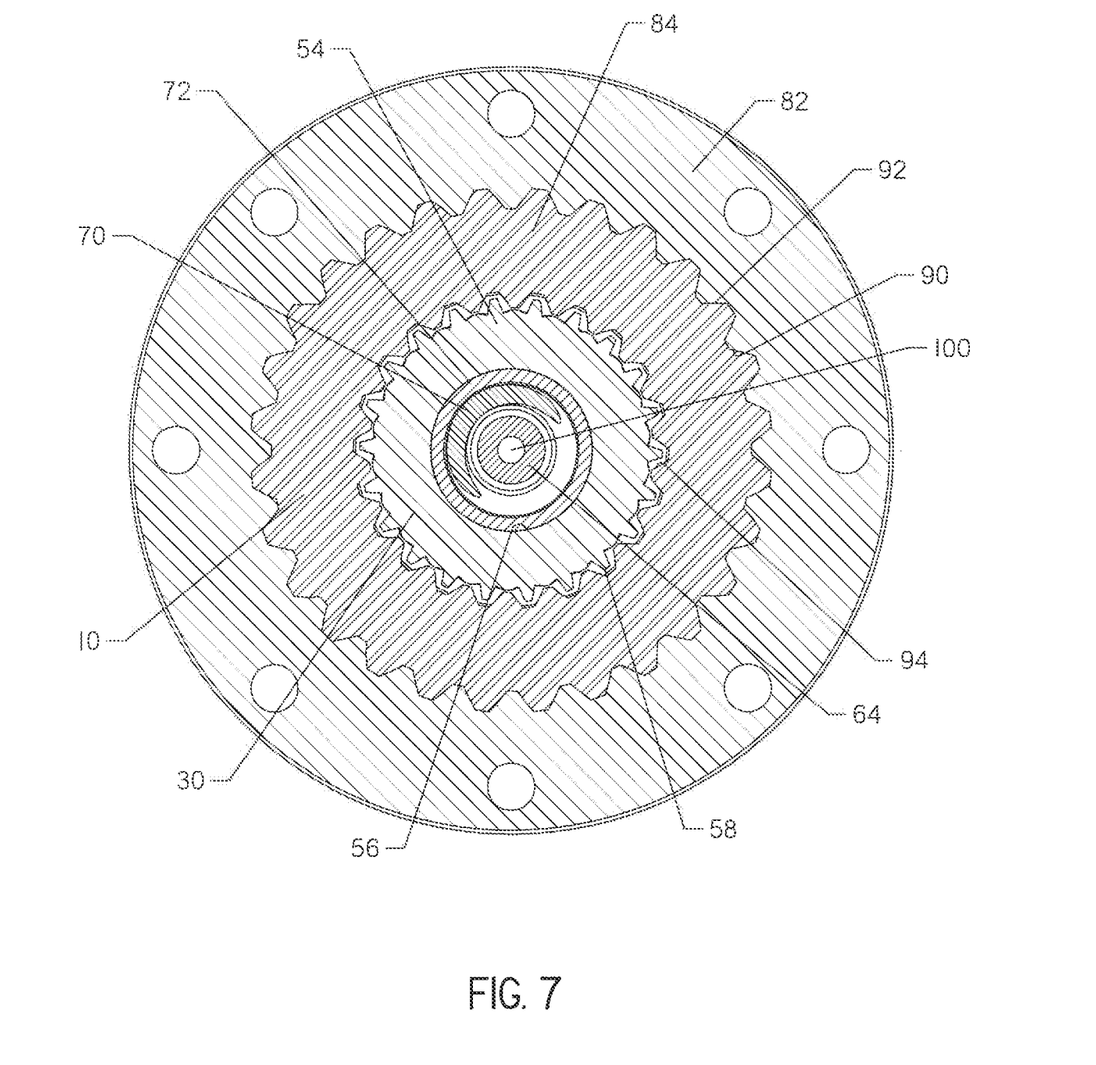
FIG. 7 is a sectional view of the rotation brake of FIG. 4, taken along line A-A.

With reference now to FIG. 4, the rotation brake 10 is shown in more detail. As shown, the motor output pinion 30 is shown with neighboring elements of the gearbox 14 removed for clarity. The motor output pinion 30 comprises a motor connection 50, a plurality of teeth 52, and the lock interface 54. The motor connection 50 is rotationally driven by the motor 16 (FIG. 3), which turns the entire motor output pinion 30. The teeth 52 interact with the central gear 32 (FIG. 3). The lock interface 54 is sized to engage with the rotation brake 10. As shown, the lock interface 54 comprises an internal cavity 56 and a plurality of external splines 58 (FIG. 7). The cavity 56 and splines 58 enable the connection between the rotation brake 10 and lock interface 54 as will be discussed in more detail below.

The rotation brake 10 comprises an actuator assembly 60 and a brake assembly 62. The actuator assembly 60 comprises a cylinder rod 64, a piston 66, a cylinder coupler 68, a hydraulic chamber 69 and a compression spring 70. The compression spring 70 is contained within a spring housing 72 and engaged at a first end 74 to a reaction wall 75 and at a second end 76 to the spring housing. As shown, the spring housing 72 fits within the internal cavity 56 of the motor output pinion 30.

The cylinder rod 64 is coupled to the spring housing 72. Pressurized fluid, such as hydraulic fluid, may be applied to the hydraulic chamber 69 of the actuator assembly 60 through the cylinder coupler 68. The fluid causes the chamber 69 to expand and the piston 66 to move away from the motor output pinion 30. The piston 66 is coupled to the cylinder rod 64. Therefore, as the actuator assembly 60 is activated by fluid, the cylinder rod 64 and spring housing 72 move away from the motor output pinion 30. Additionally, the compression spring 70 is compressed as the distance between the reaction wall 75 and the spring housing 72 decreases.

The brake assembly 62 comprises a brake cover 80, a brake cap 82, and a brake lock 84. The brake cover 80 is attached by connectors 86 to the gearbox 14 (FIG. 2) and not rotatable relative to the gearbox. As shown, the connectors 86 are bolts or screws. The brake cap 82 is attached to the brake cover 80 between the brake cover and the gearbox 14 by the connectors 86. The brake cap 82 is shown as a separate element from the brake cover 80, though these may be integrally formed. The brake cap 82 comprises internal features such as splines 90 (FIG. 7).

The brake lock 84 comprises external features, such as splines 92 for engaging the splines 90 of the brake cap. Additionally, the brake lock 84 comprises internal features, such as splines 94 for engaging the lock interface 54 (FIG. 7). The brake lock 84 is attached to the spring housing 72 and thus movable from a first position to a second position by actuation of the actuator assembly 60. In the first position, as shown in FIG. 5, the piston 66 is fully to the left, meaning that the spring housing 72 moves the brake lock 84 such that the splines 94 of the brake lock do not engage with the lock interface 54. Therefore, the rotation brake 10 is in the disengaged position. In the second position, as shown in FIG. 4, the piston 66 is moved to the right by expansion of the compression spring 70, causing the brake lock 84 to be moved into a cavity between the brake cap 82 and the lock interface 54. The brake cap 82 does not rotate, meaning that the brake lock 84 holds the lock interface 54 in place, thus stopping or preventing rotation of the motor output pinion 30. When the brake lock 84 is in the second position, the rotation brake 10 is engaged.

While the actuator assembly 60 is shown with a hydraulically actuated piston 66 and a compression spring 70 moving the cylinder rod 64 in response to changes in fluid pressure, other actuator assemblies may be contemplated, such as dual-action hydraulic cylinders, screw drives, etc. Further, while the compression spring 70 of the current invention biases the rotation brake to an engaged position in the absence of fluid pressure, the opposite configuration may be utilized such that hydraulic pressure is required for activation of the rotation brake.

While the features shown for interaction between the rotation brake 10 and motor output pinion 30 are splines 90, 92, 94, other features may be utilized, such as geometric profiles (for example, hexagonal cavities), rotational stops, etc. Additionally, the interface between the brake lock 84 and brake cap 82, and/or the interface between the brake lock 84 and lock interface 54, may allow for some spring resistance when in the second position to quickly slow then stop rotation of the motor output pinion 30 rather than providing an instantaneous stop.

Rotation of the motor output pinion 30 and actuation of the rotation brake 10 may cause pressure to build up in the gearbox 14. An internal passage 100 exists due to a central bore through the motor output pinion 30, spring housing 72 and cylinder rod 64. The internal passage should allow transmission of pressure changes between the gearbox 14 and a barrel end 102 of the rotation brake 10. An air vent 104 may be provided at the barrel end 102 of the rotation brake 10 such that sudden increase and decrease of pressure within the gearbox 14 is translated to the atmosphere, preventing pressure-related resistance to actuation of the rotation brake 10. O-Rings 105 are placed about a periphery of the piston 66 to isolate the air existing in the barrel end 102 from the hydraulic chamber 69 of the barrel end. A mechanical switch 1o8, pressure sensor, or the like may be provided at the coupler 68 or elsewhere to indicate the hydraulic pressure in the chamber 69. This information may be provided to a control system (not shown) to indicate whether the brake 10 is actuated such that the motor 16 (FIG. 2) may be slowed or placed in neutral.

Figure 6:
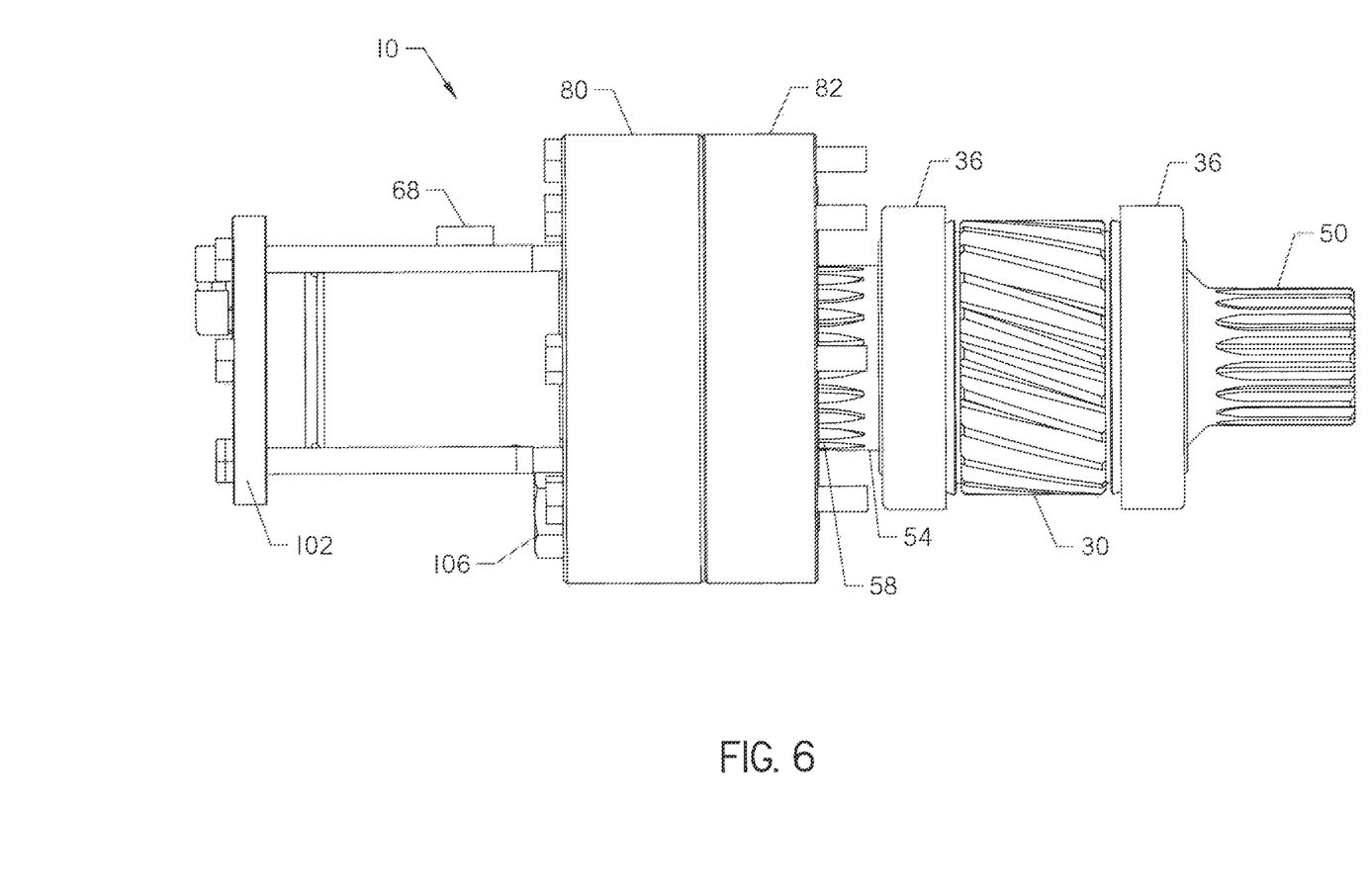
FIG. 6 is a side view of the rotation brake of FIG. 4.

With reference now to FIG. 6, the rotation brake 10 is shown from the side with the gearbox 14 removed. The splines 58 of the lock interface 54 are shown in detail. Preferably, the splines 58 taper from a wider profile proximate rotation brake 10 to a smaller profile further from the rotation brake. In this way, corresponding splines 94 of the brake lock 84 engage more easily with the rotating lock interface 54 upon actuation of the rotation brake 10 while allowing for a tight connection when fully engaged. One of ordinary skill will appreciate that the compression spring 70 allows the brake lock 84 to recoil if the splines 58 of the lock interface 54 and splines 94 of the brake lock 84 do not immediately mate upon actuation of the rotation brake 10. A magnetic plug 106 is provided to access, lubricate and clean the area proximate the brake lock 84 within the brake cover 80. The coupler 68 may be connected to a hose (not shown) or other connection for transmission of pressurized fluid.

With reference now to FIG. 7, a cross-section A-A of FIG. 4 is provided to give clarity to the engagement between the motor output pinion 30 and the rotation brake 10. The splines 90 of brake cap 82 interact with external spines 92 of brake lock 84. The splines 58 of the lock interface 54 interact with internal splines 94 of brake lock 84. Therefore, no relative rotation is allowed between the brake cap 82 and lock interface 54 of the pinion 30 when the brake lock 84 is engaged. The spring housing 72 is located within a cavity 56 of lock interface 54. The spring housing 72 and brake lock 84, as described with reference to FIG. 4, move in concert. As shown in FIGS. 4 and 7, the compression spring 70 provides engagement force to the brake lock 84 and spring housing 72, while actuation of the cylinder rod 64 causes the brake lock 84 and spring housing 72 to move out of engagement with the lock interface 54. The internal passage 100 is shown within the cylinder rod 64 in FIG. 7.

Brake Actuation Assurance

With reference to FIG. 8A, logic that the controller 15 uses for determining whether the rotation brake 10 has actuated and mated is shown. At step 202, the brake 10 can either be initialized or rotation of the spindle 12 can be initialized. If rotation of the spindle 12 is initialized at step 204, there is no need for application of the brake 1o. The rotation, in either the clockwise or counterclockwise direction, continues until another request is received.

If a change is made and the rotation brake 10 is activated from a rotating condition such as at step 204, rotation is slowed at step 206 through the slowing of the motor 16 output. Preferably, rotation of the spindle 12 is slowed to less than five RPM. The rotation brake 10 is then activated at step 208.

If the brake is actuated, the proper engagement of the brake is checked at step 209. The logic associated with this step is shown in more detail in FIG. 8B. In order to determine whether or not the rotation brake 10 is mated appropriately, the pressure sensor 49 (FIG. 2) is monitored. Once the brake is engaged, a short predetermined time interval is allowed to elapse. The motor 16 is then actuated to produce one or more trial rotational pulses, where are applied to the spindle 12. Preferably, the one or more trial rotational pulses include a pulse applied in each of the clockwise and counterclockwise directions. Each pulse may have a duration of one second or less, such as 750 milliseconds.

For example, the motor 16 transmits a clockwise torque to the spindle at step 210. The pressure sensor 49 may indicate a pressure spike at step 210. Such a spike means that the brake 10 has mated with the motor output pinion 30 (FIG. 4) so that clockwise rotation is prevented. If no pressure spike is detected notwithstanding the engagement of the brake 10, a rotation error is reported to the controller 15 at step 212. If the expected pressure spike is observed, a short delay occurs at step 214. Such a delay ensures that any effects of the first rotational pulse have dissipated before an oppositely directed second rotational pulse is applied. This delay may be, for example, 500 milliseconds.

The motor 16 then transmits a counterclockwise torque to the spindle at step 216. Like in step 210, the pressure sensor 49 may indicate a pressure spike at step 216. This spike indicates the brake 10 has mated with the motor output pinion 30 (FIG. 4) so that counterclockwise rotation is prevented. If no pressure spike is detected, a rotation error is reported to the controller 15 at step 212. If the expected spike is detected, the rotation brake 10 is confirmed to be on at step 218. The oppositely-directed rotational pulses may be applied to the spindle 12 in any order.

When the splines of the pinion 30 (FIG. 4) and rotation brake 10 are misaligned, rotation of the spindle 10 may occur despite actuation of the rotation brake 10. In such an event, one or more of the rotational pulses initiated at steps 210 and 216 will fail to produce the expected pressure spike.

In such an event, the pressure sensor 49 causes an error signal to be transmitted to the controller 15, as shown at step 212.

When an error is generated at step 212, the spindle assembly 12 is automatically rotated back and forth over a small angular displacement as shown at step 220. The small angular displacement can be as large as 20 degrees or as little as 1 degree or less. The goal of alternating the rotation is to cause the rotation brake 10 to properly mate with the motor output pinion 30 (FIG. 4). This process may be referred to as "dithering". Steps 210, 214 and 216 are then repeated. If no pressure spike is detected, steps 212 and 220 are repeated as well. Repetition of these steps continues until such time as the pressure sensor 49 generates no error signal.

Once the brake is confirmed to be on at step 218, the brake remains on until a change is detected, causing the brake to disengage at step 222 and return to idle.

While the rotation brake 10 is activated, the carriage 5 may advance a drill pipe segment 4 without rotation to "steer" the drill string as discussed above. Because any rotation of the spindle and drill string during steering will tend to cause error in the bore path, assurance of accurate spindle position is advantageous.

It should be appreciated that a downhole sonde (not shown) supported by the drill string may include a clock position sensor. This sensor (not shown) may be utilized with the rotational sensor 110 on the spindle assembly 12 to allow the controller 15 to correct for any error caused by windup of the drill string by releasing the brake 10 and reorienting the spindle.

Virtual Brake

As discussed above, the motor 16 may be used to act as a virtual brake system 300. With reference to FIGS. 1 and 9, controller 15 operates the virtual brake system 300. Such a virtual brake system 300 may be included as an optional feature on a system that does include a rotation brake 10.

The virtual brake system 300 (FIG. 9) comprises the controller 15 and the motor 16 for rotating the spindle assembly 12. The controller 15 determines at step 302 whether the virtual brake is activated by an operator. If not, the drilling system may maintain normal operations. If a steering correction is needed, the operator stops the rotation of the drill string to advance the drill string without rotation. The virtual brake switch is turned on and the desired spindle 12 clock position is captured at step 304. A clock position of the spindle assembly 12 is monitored by the rotational sensor 110 at step 306. The clock position is sent to the controller 15.

So long as the spindle remains within an accepted tolerance from the desired clock position, normal operations of the drilling system may be maintained with the virtual brake system 300 engaged. Error tolerance may be as much as fifteen degrees. Preferably, the tolerance is 3 degrees or less. Tolerances of 0.5 degrees or less may be used. The smaller the error tolerance, the more precise the steering. However, extremely small tolerances may generate more corrections than desired.

While the virtual brake system 300 is actuated, the drilling system may advance a pipe segment 4 using the carriage 5 without rotation. The geometry of the downhole tool (not shown) will cause it to steer the advancing drill string.

While advancing the pipe segment 4, underground conditions may cause the pipe segment 4 and spindle to deviate from the desired orientation. The rotational sensor 110 systematically sends signals to the controller 15 indicating the clock position of the spindle 12. The controller 15 compares the clock position to the desired orientation.

When the clock position of the spindle 12 exceeds the error tolerance, the controller 15 indicates a clock position error at step 308. The controller 15 will transmit a correction signal to the pump 48 (FIG. 2) at step 310. In response, the motor 16 rotates the spindle 12 in a clockwise or counter-clockwise direction to return the spindle to the proper clock position (step 305).

An activation status of the brake is monitored by the controller 15 at step 312. If activation is maintained at step 312, the spindle 12 position continues to be monitored. If the virtual brake is deactivated at step 312, the spindle assembly 12 returns to standard operation at step 314. During standard operation, the spindle assembly 12 may float during thrust, or may be rotated by the motor 16 if desired.

It should be appreciated that a downhole sonde (not shown) supported by the drill string may include a clock position sensor. This sensor (not shown) may be utilized with the rotational sensor 110 on the spindle assembly 12 to allow the controller 15 to correct for any error caused by windup of the drill string. Deviation or rotation of the downhole tool during thrust without rotation may be caused by drill string wind up. Such deviation may necessitate corrections by the virtual brake system 300 even when the rotational sensor 110 does not sense significant movement.

Additionally, one of ordinary skill in the art will appreciate that use of a virtual brake system 300 may be utilized on drills where the actual rotation brake 10 is eliminated.

Rotation Brake Operation

In operation, with the rotation brake 10 disengaged, the spindle assembly 12 is rotated by the motor 16 to connect to a pipe segment 4. The spindle assembly 12 is then advanced along the drill frame 6 while rotating to connect the pipe segment 4 to a drill string. The spindle assembly 12 continues rotation and advancement to advance the drill string into the ground. As shown in FIGS. 4 and 5, the rotation brake 10 is engaged by removal of hydraulic pressure applied through cylinder coupler 68, causing the piston 66 and cylinder rod 64 be pulled by compression spring 70. The brake lock 84 then engages the brake cap 82 and the lock interface 54 of the motor output pinion 30 to cause rotation to stop. Optionally, the motor 16 may be placed into neutral by a control system, such as a mechanical switch 108 (FIGS. 4-5), upon loss of hydraulic pressure in cylinder coupler 68.

The rotation brake 10 is then disengaged, and the rotation of the spindle assembly 12 reversed to disconnect the spindle assembly from pipe segment 4. As shown in FIGS. 4 and 5, the rotation brake is disengaged through addition of hydraulic pressure through cylinder coupler 68, causing the piston and cylinder rod to compress compression spring 70. The brake lock 84 is removed from engagement with and allows relative rotation between the lock interface 54 and brake cap 82. Optionally, the motor 16 may not be activated until after the rotation brake 10 is disengaged, though preferably the rotation brake is powerful enough to disengage the brake lock 84 even when the motor is active. After the spindle assembly 12 is disconnected from pipe segment 4, the brake is engaged, rotation stops, and the spindle assembly is moved back along drill frame 6 to begin an additional iteration of the process.

One of ordinary skill in the art will appreciate that the above steps may be performed substantially in reverse to remove a pipe segment from a pipe string during backreaming operations of the horizontal directional drill 2.

It should be appreciated by those skilled in the art that various modifications and variations can be made in the present invention without departing from the scope and spirit of the invention. It is intended that the present inven-

The invention claimed is:

1. A method comprising:
monitoring a signal indicative of an orientation of a downhole tool, in which the downhole tool orientation is monitored using a rotational sensor at a spindle;
selecting a desired downhole tool orientation;
actuating rotation of a spindle configured to provide rotational force to the downhole tool;
causing rotation of the spindle to cease when the signal indicates the downhole tool is within an error tolerance of the desired downhole tool orientation;
actuating advancement of the downhole tool;
while advancing the tool, monitoring the signal; and
while advancing the tool, rotating the spindle to maintain the downhole tool within the error tolerance of the desired downhole tool orientation.

2. The method of claim 1 in which the downhole tool orientation is monitored using a clock sensor at the downhole tool.

3. The method of claim 2 comprising:
comparing the downhole tool orientation as monitored by the clock sensor to the downhole tool orientation as monitored by the rotational sensor; and
correcting for error between the two orientations when rotating the spindle until the downhole tool is at the desired downhole tool orientation.

4. The method of claim 1 in which the desired tool orientation has an error tolerance is 0.5 degrees.

5. The method of claim 1 in which the error tolerance is fifteen degrees.

6. The method of claim 1 further comprising:
stopping advancement of the tool when the downhole tool orientation is outside the error tolerance of the desired downhole tool orientation.

7. The method of claim 1 further comprising:
selecting a desired drill path;
wherein the desired downhole tool orientation is selected in response to the desired drill path.

8. An apparatus comprising:
a frame;
a spindle supported on the frame;
a drill string having a first end and a second end, wherein the drill string is removably and rotatably attached to the spindle at the first end;
a downhole tool disposed at the second end of the drill string; and
a processor, configured to perform the method of claim 1.

9. A method, comprising:
rotating a drill string with a spindle and advancing the drill string with a carriage;
selecting a desired orientation of the spindle, wherein the step of selecting the desired orientation of the spindle comprises:
determining a desired drill string path; and
planning steering steps having specific spindle orientations to maintain the drill string on the desired drill string path;
stopping the spindle at the desired orientation;
advancing the drill string without rotation;
monitoring a clock position of the spindle; and
rotating the spindle to the desired orientation when the difference between the clock position and the desired orientation exceeds an error tolerance.

10. The method of claim 9 further comprising:
detecting a clock position of a downhole tool disposed at an end of the drill string distal from the carriage.

11. The method of claim 10 further comprising:
using the clock position of the spindle and the clock position of the downhole tool, adjusting the desired orientation of the spindle.

12. The method of claim 9 further comprising:
rotating the drill string while advancing the drill string when the desired drill path is straight.

13. The method of claim 9 wherein the step of advancing the drill string without rotation is performed when the desired drill path is curved.

14. The method of claim 9 in which the error tolerance is three degrees.

15. A method for drilling a bore along a path, comprising:
monitoring a clock position of a drill bit by monitoring a clock positions of a spindle configured to rotate the drill bit;
advancing the drill bit with rotation to maintain a straight path;
advancing the drill bit while maintaining the drill bit in a desired orientation to deviate from the straight path; and
while advancing the drill bit to deviate from the straight path, rotating the drill bit when the difference between the clock position and the desired orientation exceeds an error tolerance.

16. The method of claim 15 further comprising:
monitoring a clock position of an orientation sensor located at the drill bit and comparing it to the clock position of the spindle to generate a drill string wind up value; and
using the drill string wind up value to correct error in the value of the drill bit clock position.

17. A method, comprising:
advancing a drill string with a horizontal directional drill, the horizontal directional drill comprising a spindle, a carriage and the drill string, the drill string extending from the spindle to a drill bit;
operating the horizontal directional drill with at least one motor;
monitoring a spindle position of the spindle with a rotational sensor;
stopping the operation of the horizontal directional drill at a stopped position;
storing the stopped position in a memory;
monitoring an actual position of the horizontal directional drill while operation of the horizontal directional drill is stopped to determine whether the difference between the stopped position and the actual position exceeds an error tolerance; and
operating motor when the difference between the stopped position and the actual position exceed the error tolerance to place the horizontal directional drill within the error tolerance.

18. The method of claim 17 wherein:
the motor drivers rotation of the spindle; and
the stopped position comprises a clock position of the drill bit.

19. The method of claim 18 wherein the operation of the horizontal directional drill comprises rotation of the spindle.

20. The method of claim 18 wherein stopping the operation of the horizontal directional drill comprises stopping the advance of the carriage.

* * * * *

UNITED STATES PATENT AND TRADEMARK OFFICE
CERTIFICATE OF CORRECTION

| | |
|---|---|
| PATENT NO. | : 11,686,180 B2 |
| APPLICATION NO. | : 17/473419 |
| DATED | : June 27, 2023 |
| INVENTOR(S) | : Greenlee et al. |

It is certified that error appears in the above-identified patent and that said Letters Patent is hereby corrected as shown below:

In the Specification

Column 2, Line 37, please delete "1o" and substitute therefor "10".
Column 3, Line 37, please delete "1o" and substitute therefor "10".
Column 5, Line 39, please delete "1o8" and substitute therefor "108".
Column 6, Line 19, please delete "1o" and substitute therefor "10".

In the Claims

Column 10, Claim 15, Line 3, please delete "positions" and substitute therefor "position".

Signed and Sealed this
Twenty-fifth Day of July, 2023

Katherine Kelly Vidal
*Director of the United States Patent and Trademark Office*